US011109373B2

(12) United States Patent
Chongoushian

(10) Patent No.: US 11,109,373 B2
(45) Date of Patent: Aug. 31, 2021

(54) MULTIPLE MESSAGE SINGLE TIMESLOT LINK 16 RELAY TRANSMISSION

(71) Applicant: BAE SYSTEMS Information and Electronic Systems Integration Inc., Nashua, NH (US)

(72) Inventor: John H Chongoushian, Emerson, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 97 days.

(21) Appl. No.: 16/656,710

(22) Filed: Oct. 18, 2019

(65) Prior Publication Data

US 2021/0120550 A1  Apr. 22, 2021

(51) Int. Cl.
*H04W 72/04* (2009.01)
*H04B 7/155* (2006.01)

(52) U.S. Cl.
CPC ...... *H04W 72/0446* (2013.01); *H04B 7/1555* (2013.01); *H04B 7/15542* (2013.01)

(58) Field of Classification Search
CPC ........... H04W 72/0446; H04B 7/15542; H04B 7/1555
See application file for complete search history.

(56) References Cited

U.S. PATENT DOCUMENTS

| 4,943,978 | A * | 7/1990 | Rice | H04L 29/06 |
| | | | | 370/300 |
| 7,203,688 | B2 * | 4/2007 | Hopkins | G06F 40/10 |
| 2014/0038541 | A1 * | 2/2014 | Reiss | H04B 15/00 |
| | | | | 455/296 |
| 2014/0115103 | A1 * | 4/2014 | Holmes | H04L 67/02 |
| | | | | 709/217 |
| 2015/0071257 | A1 * | 3/2015 | Yang | H04W 72/0413 |
| | | | | 370/336 |
| 2019/0059014 | A1 * | 2/2019 | Sanderovich | G01S 13/765 |
| 2020/0036487 | A1 * | 1/2020 | Hammond | H04L 5/0012 |
| 2020/0126435 | A1 * | 4/2020 | Chongoushian | G08G 5/045 |
| 2020/0272605 | A1 * | 8/2020 | More | G06N 3/088 |

OTHER PUBLICATIONS

International Search Report, PCT/US2020/055653, dated May 28, 2021, 7 pages.

* cited by examiner

*Primary Examiner* — Congvan Tran
(74) *Attorney, Agent, or Firm* — Maine Cernota & Rardin; Scott J. Asmus

(57) ABSTRACT

A method of transmitting and receiving a plurality of Link 16 messages on a single subnet in a single timeslot includes a transmitting terminal packaging the Link 16 messages into an envelope enhanced throughput message (envelope LET message) and transmitting the envelope LET message to a receiving terminal, followed by the receiving terminal unpacking the Link 16 messages from the envelope LET message, restoring them to their original form, and presenting them to a host. Modification of the host is not required. The Link 16 messages can be relayed messages, and the transmitting terminal can be a relay terminal. The Link 16 messages can be concatenated within the envelope LET message, or another lossless packaging algorithm such as lossless compression can be applied. The terminals can be JTRS terminals, the Link 16 messages can be 115 kbps messages, and the envelope LET message can be a 2 Mbps LET message.

20 Claims, 7 Drawing Sheets

MULTIPLE MESSAGE SINGLE TIMESLOT LINK 16 RELAY TRANSMISSION

FIELD

The disclosure relates to Link 16 communications, and more particularly to Link 16 relay transmissions.

BACKGROUND

Link 16 is a widespread tactical wireless networking system that is used by frontline land, air, and naval systems in the United States, NATO, and allied nations to allow multiple users to share situational awareness via voice, navigation, and data communications.

Information is transmitted on a Link 16 network in Time Division multiple Access ("TDMA") timeslots that repeat every frame, or "epoch." Interception of Link 16 communications is rendered more difficult by assigning 51 discrete transmission frequencies to the network, and defining communication channels that "hop" in a pseudo-random pattern between these frequencies during each timeslot. Typically, there are 128 timeslots per second, with a frequency hopping rate of every 13 microseconds. This distribution of Link 16 communications over 51 frequencies enables a plurality of communication channels or "nets" (referred to by their "net numbers") to operate simultaneously over the network using a form of Frequency Division Multiple Access ("FDMA") wherein, at any given moment, different channels are assigned to different frequencies. Due to the frequency hopping aspect of Link 16, the frequency assignments of the channels change rapidly, but the hopping patterns are configured such that frequency division between the communication channels is preserved. This allows the communication channels to be "stacked" or "multi-netted," where "stacked" communication refers generally to the assignment of more than one channels or "net number" to the same network participation group (NPG) of terminals, whereas "multi-netting" refers to the more general case of more than one channel being used by one or more NPGs.

A typical link 16 network is illustrated in FIG. 1. The blocks 10 in the ring 12 represent time slots. Each Link 16 participant terminal 14 is initialized by a network planner (not shown) prior to start of a mission with a unique identifier, known as the Source Track Number (STN), along with NPG assignments and time slot assignments that indicate which time slots are to be used for transmitting and receiving. The column 16 to the right of the ring 12 indicates the ability for Link 16 to operate on multiple channels or subnets (shown as stacked rings in the column 16).

A single Link 16 "message" transmitted during a single timeslot can include 3, 6, or 12 Link 16 data words, depending on whether the Standard (STD), Packed-2 double packed (P2DP), or Packed-4 (P4) data packing structure is used. Each Link 16 data word contains 70 bits of data. Four types of transmissions are possible:
Fixed Word Format (FWF), also referred to as fixed format (FF)
Free Text (FT)
Variable Message Format (VMF)
Round-Trip Timing (RTT)

Link 16 messages include both "transmission security" (TSEC), at least in the form of frequency hopping, and "message security" in the form of message encryption. These security features can be provided in either "Common Variable Mode" (CVM) or "Partitioned Variable Mode" (PVM). In CVM mode, the Link 16 terminal uses a single cryptographic variable (key) to generate both a pseudorandom sequence for TSEC operations (e.g. frequency hopping pattern) and to provide MSEC (e.g. encryption). In PVM mode, the terminal uses a first cryptographic variable (key) to generate the pseudorandom sequence for encryption of the message (MSEC), and a separate, second cryptographic variable to generate the pseudorandom sequence for transmission of the message (TSEC). PVM thereby allows a message to be received and retransmitted by a relay node without providing decryption information to the relaying node.

Given that the transmit power for Link 16 radios is typically 200 Watts, and the communications range for Link 16 is approximately 300 nautical miles, relays are almost always required for large operational areas. Timeslots for relaying of information are assigned in advance during network design, and selected participant terminals (nodes) in the network are designated to be relay nodes. Each relayed message requires the assignment of two timeslots as a "relay pair," whereby the message is received by the relay node during the first timeslot of the relay pair, and then retransmitted by the relay node during the second timeslot of the relay pair.

The Link 16 protocol defines three relay modes, which are "unconditional," "conditional," and "suspended." Nodes that are assigned to the unconditional relay mode always relays messages received in the assigned relay time slots, regardless of location. Nodes that are assigned to the suspended mode never serve as relays. A relay node that is assigned to the conditional relay mode will only relay a received message if it has the greatest geographical coverage at the time that the message is received, as defined by its height and range, which are reported in Precise Participant Location and Identification (PPLI) messages exchanged between the nodes. Details of the construction of the PPLI messages can be found in MIL-STD-6016, incorporated herein by reference for all purposes.

"Multifunctional Information Distribution System" (MIDS) is the NATO name for the communication component of Link-16, which has previously been implemented as MIDS-LVT, where "LVT" refers to "low volume terminals." With reference to FIG. 2, the corresponding LVT Link 16 terminals 200, which are referred to as Joint Tactical Information Distribution System (JTIDS) terminals, include only one transmitter 202 and one low bandwidth receiving channel 204, and are able to exchange information within the Link 16 network at a maximum rate of 115 kbps (kilo-bits per second).

With reference to FIG. 3, in some applications, the MIDS-LVT standard and JTIDS terminals are currently being replaced by the newer MIDS-JTRS standard implemented on JTRS "Joint Tactical radio System" terminals 300. The JTRS Link 16 terminal 300 is a Software Defined Radio (SDR) that is compliant with the JTRS (i.e. MIDS-JTRS) Software Communication Architecture (SCA). MIDS-JTRS maintains the data, voice and navigation functionality that is also provided by the older MIDS-LVT standard. However, in addition to a transmitter 302 and first receiver 304, JTRS terminals include three additional receiver channels 306, 308, 310. According to MIDS-JTRS, the transmitter 302 and all of the receivers 304, 306, 308, 310 are able to exchange Link-16 Enhanced Throughput ("LET" or "ET") messages at a data rate of 2 Mbps, as well as standard 115 kbps messages. Link 16 terminals that participate in MIDS-LVT or MIDS-JTRS networks are called JTIDS units 200 or JTRS units 300, respectively. Both are commonly referred to as "JU's." However, the present disclosure is directed to MIDS-JTRS and to JTRS terminals. Accordingly, the term "JU" whenever used herein refers specifically to a JTRS terminal unless otherwise identified in the context.

The messages exchanged over a Link 16 network are called J-series messages. Each J-series message format is identified by both a label and a sublabel. For a J12.6 message, for example, the "J" indicates Link 16, the "12" is the message label, and the "0.6" is the message sublabel. There are 256 possible message definitions (32×8=256). However, not all 256 possible label and sublabel combinations are currently defined as valid J-series identifications.

Due to the provision of four receiver channels, a JTRS terminal is able to receive up to four messages within a single timeslot. These can be either "contentious" messages transmitted simultaneously within a single subnet according to the "Concurrent Contention Receive" or "CCR" receive mode, or they can be messages transmitted separately but simultaneously within different subnets according to the "Concurrent Multi-Netting" or "CMN" receive node. However, the JTRS terminal only includes one transmitter, and is therefore only able to transmit one message during any given timeslot. In the example described herein, Link 16 operates in the contentious approach and CCR allows a terminal to receive up to four messages, in a time slot, which allows pool sizes to be reduced, yet still maintain the same bandwidth and probability of reception.

The enhanced capabilities of the JTRS terminal as compared to the older LVT JTIDS standard have increased the power of the Link 16 network in many ways. In particular, the ability to receive up to four messages simultaneously has led to a significant increase in message and data traffic, which in turn has led to a significant increase in the demand for message relay capability. As a result, it can be necessary in MIDS-JTRS networks to assign a much larger number of terminals as relay terminals, and to assign many more timeslots as relay timeslots. This, however, can represent a significant burden on the Link 16 nodes and a significant reduction of available communication timeslots.

What is needed, therefore, is a method of increasing the message relay capacity of an MIDS-JTRS Link 16 subnet without increasing the number of relay terminals that are required or the number of timeslots that must be assigned as relay timeslots without changes outside the terminal.

SUMMARY

According to the present disclosure, the functionality of an MIDS-JTRS terminal is enhanced so as to enable it to package a plurality of conventional Link 16 messages, including message data, headers, and key management data, into a single, high bandwidth Link 16 Enhanced Throughput ("LET" or "ET") message, referred to herein as an "envelope" LET message, so that the envelope LET message can be transmitted by the MIDS-JTRS terminal within a single timeslot. The MIDS-JTRS terminal is further enhanced so that it is able to receive envelope LET messages, unpack them, and provide the packaged messages to the host in their original structure, as if they had been received as conventional Link 16 messages in separate timeslots. As a result, no modification of the host is needed. Embodiments are able to package at least four conventional Link 16 messages into a single envelope LET message. In embodiments, this ability to package a plurality of messages within a single envelope LET is applied to Link 16 message relay, whereby the message relay capacity of an MIDS-JTRS Link 16 subnet is significantly increased without increasing the number of relay terminals that are required or the number of timeslots that must be assigned as relay timeslots.

In embodiments, the messages that are packaged with in an envelope LET message are concatenated within the envelope LET message, i.e. stored sequentially within the envelope LET message in substantially unmodified form. However, it should be understood that the scope of the present disclosure is not limited to concatenation of packaged messages, but extends to any message packaging format that enables a plurality of Link 16 messages to be packaged into a single envelope LET message within a single timeslot, and to be recovered from the single envelope LET message and restored to their original form without degradation.

It should further be noted that the present disclosure applies generally to the packaging of a plurality of Link 16 messages that would normally have been transmitted separately at a first data rate into a single envelope LET message that can be transmitted at a second data rate that is higher than the first data rate. In particular, the present disclosure includes but is not limited to packaging of messages received at the "standard" Link 16 message data rate of 115 kbps, nor is it limited only to transmission of the envelope LET message at any specific data rate. Furthermore, while embodiments implement the disclosed multi-message single timeslot LET method to increase the capacity of a JTRS terminal to relay messages, it should be understood that the present disclosure is not limited to only relay applications.

Embodiments of the present disclosure enable an MIDS-JTRS terminal to receive a plurality of conventional Link 16 messages within a single timeslot, for example up to four messages using the four JTRS receiver channels, and to relay all of the received message as a single envelope LET message during a signal timeslot. Similarly, in embodiments a plurality of conventional Link 16 messages received during a plurality of timeslots can be packaged and relayed during a single relay timeslot. Embodiments further enable an MIDS-JTRS terminal to receive and relay envelope LET messages in single relay pairs of timeslots.

In embodiments, the format of the new envelope LET messages includes at least one identifying data symbol that identifies the message as being an envelope LET message, so that only terminals in which the present disclosure has been implemented will attempt to receive and interpret the envelope LET messages. For example, current Link 16 LET messages use a "1" (FF) or a "2" (FT) in the sixth header symbol. Embodiments set this symbol to an otherwise unused value, i.e. to a value greater than 2. In some of these embodiments envelope LET messages include a 3 or a 4 as the sixth header symbol, where "3" is used for a CVM message and "4" is used for a PVM message. In embodiments, packaging and relay of PVM messages does not require decoding of the messages, and does not require knowledge by the relaying node of the MSEC key.

Some embodiments require that the messages that are packaged within the envelope LET message are all conventional "Fixed Format" J-code messages, i.e. FF-STD, FF-P2DP, or FF-P4. Other embodiments allow enhanced throughput messages and/or other messages having other formats to be packaged within an envelope LET message.

Embodiments transmit the envelope LET messages as J-code messages, and use a previously undefined J-series message codes, such as J31.6. Other embodiments avoid any need to modify the Link 16 message standard by transmitting the envelope LET messages as Link 16 "free text" messages. For example, all of the packaged messages, along with their header information, can be packaged as a single LET free text message. Since the packaged messages will not be directly delivered to a host (i.e. they must be unpacked first), other fields can be marked as "reserved for terminal use."

A first general aspect of the present disclosure is a method operable by a transmitting terminal of transmitting a plurality of Link 16 messages on a single Link 16 channel within a single Link 16 timeslot. The method includes accepting the plurality of Link 16 messages, packaging the plurality of Link 16 messages as a single envelope Link 16 enhanced throughput (envelope LET) message, said plurality of Link 16 messages being packaged according to a packaging protocol that enables the Link 16 messages to be subsequently unpacked from the envelope LET message and restored to their original form, and transmitting the envelope LET message.

In embodiments, the plurality of Link 16 messages are 115 kbps Link 16 messages.

In any of the above embodiments, the envelope LET message can be transmitted at an LET data rate of 2 Mbps.

In any of the above embodiments, the plurality of Link 16 messages can be received messages that require retransmission according to a Link 16 message relay mode.

In any of the above embodiments, the plurality of Link 16 messages can include at least four Link 16 messages.

In any of the above embodiments, packaging the plurality of Link 16 messages can include concatenating them sequentially in substantially unmodified form within the envelope LET message, or packaging the plurality of Link 16 messages can include applying a lossless compression algorithm to the Link 16 messages, wherein the lossless compression algorithm can include an auto-encoder.

In any of the above embodiments, the envelope LET message can include at least one identifying data symbol that enables the envelope LET message to be identified by a receiving terminal as an envelope LET message.

In any of the above embodiments, the Link 16 messages can be fixed format Link 16 messages, or free text Link 16 messages.

A second general aspect of the present disclosure is a method operable by a receiving terminal of receiving a plurality of Link 16 messages on a single Link 16 channel within a single Link 16 timeslot. The method includes receiving an envelope enhanced throughput (envelope LET) message within which the plurality of Link 16 messages is packaged according to a packaging protocol that enables the Link 16 messages to be subsequently unpacked from the envelope LET message and restored to their original form, unpacking the plurality of Link 16 messages from the envelope LET message, restoring the Link 16 messages to their original form, and presenting the restored, unpacked Link 16 messages to a host.

In embodiments, the envelope LET message includes at least one identifying data symbol that identifies the envelope LET message as an envelope LET message, and the method further comprises, before the step of unpacking: reading the at least one identifying data symbol, and identifying the envelope LET message as being an envelope LET message.

In any of the above embodiments of the second general aspect, the Link 16 messages can be relayed Link 16 messages.

In any of the above embodiments of the second general aspect, the plurality of Link 16 messages can be 115 kbps Link 16 messages.

In any of the above embodiments of the second general aspect, receiving the envelope LET message can include receiving the envelope LET message at an LET data rate of 2 Mbps.

In any of the above embodiments of the second general aspect, the received Link 16 messages can include at least four Link 16 messages.

In any of the above embodiments of the second general aspect, the Link 16 messages can be free text or fixed format Link 16 messages.

Any of the above embodiments of the second general aspect can include a computer program product including one or more machine-readable mediums encoded with non-transitory instructions that when executed by one or more processors cause a process of receiving the envelope LET message, unpacking the plurality of Link 16 messages from the envelope LET message, restoring the Link 16 messages to their original form; and presenting the restored, unpacked Link 16 messages to the host.

A third general aspect of the present disclosure is an apparatus configured for transmitting and receiving a plurality of Link 16 messages on a single Link 16 channel within a single Link 16 timeslot. The apparatus includes a transmitter, a receiver channel, an antenna cooperative with the transmitter and with the receiver channel, and a controller configured to accept the plurality of Link 16 messages, package the plurality of Link 16 messages as a single envelope enhanced throughput (envelope LET) message, said plurality of Link 16 messages being packaged according to a packaging protocol that enables the Link 16 messages to be subsequently unpacked from the envelope LET message and restored to their original form, and cause the transmitter to transmit the envelope LET message, the controller being further configured to receive from the receiver channel an envelope enhanced throughput (envelope LET) message within which the plurality of Link 16 messages is packaged according to a packaging protocol that enables the Link 16 messages to be subsequently unpacked from the envelope LET message and restored to their original form, unpacking the plurality of Link 16 messages from the envelope LET message, restore the Link 16 messages to their original form, and present the restored, unpacked Link 16 messages to a host.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

According to the present disclosure, the functionality of a MIDS-JTRS terminal is enhanced so as to enable it to package a plurality of conventional Link 16 messages, including message data, headers, and key management data, into a single, high bandwidth Link 16 Enhanced Throughput ("LET" or "ET") message, so that the LET message can be transmitted by the MIDS-JTRS terminal within a single timeslot. When the present enhancement of MIDS-JTRS is applied to Link 16 message relay, it is able to increase the message relay capacity of an MIDS-JTRS Link 16 subnet without increasing the number of relay terminals that are required or the number of timeslots that must be assigned as relay timeslots.

Figure 1:
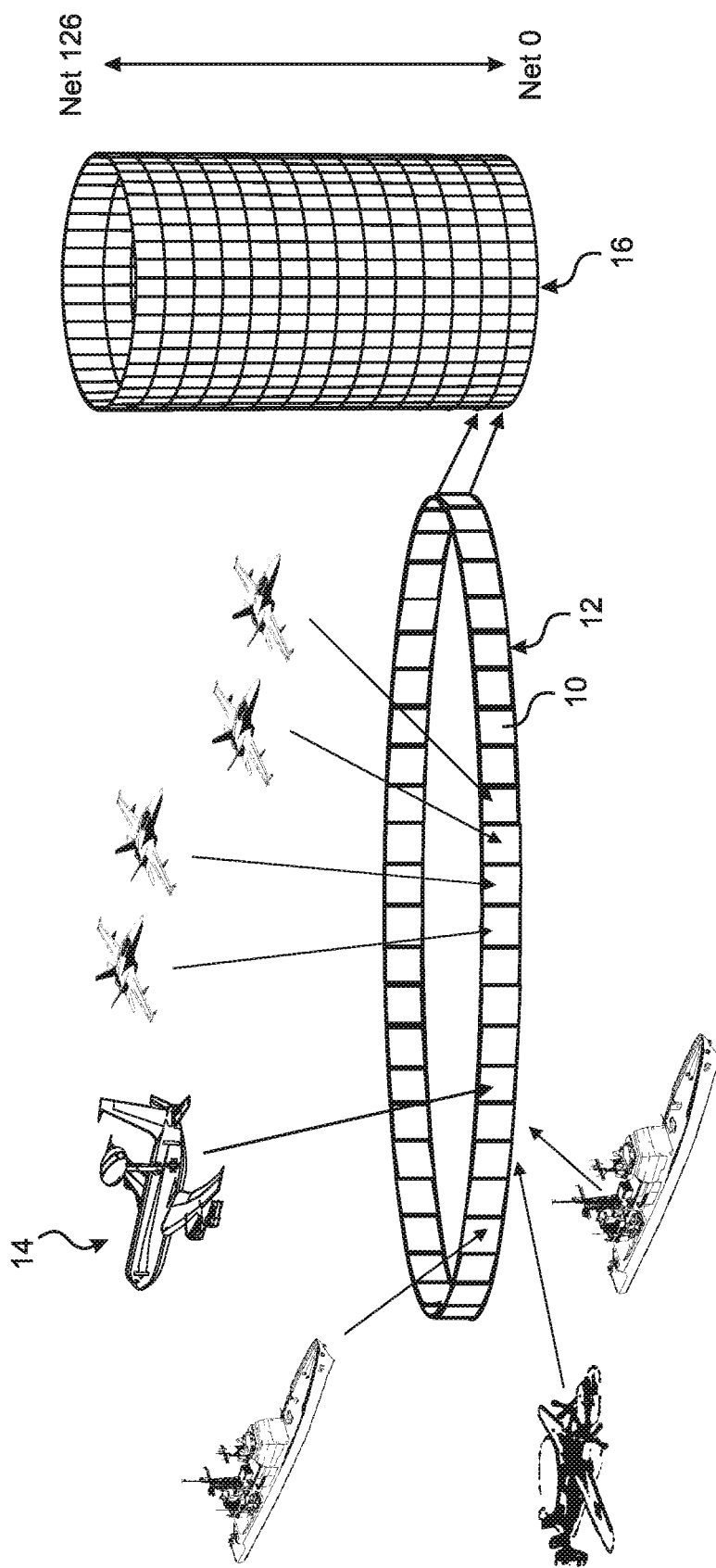
FIG. 1 is a graphical illustration of a typical Link 16 channel architecture of the prior art.
Figure 3:
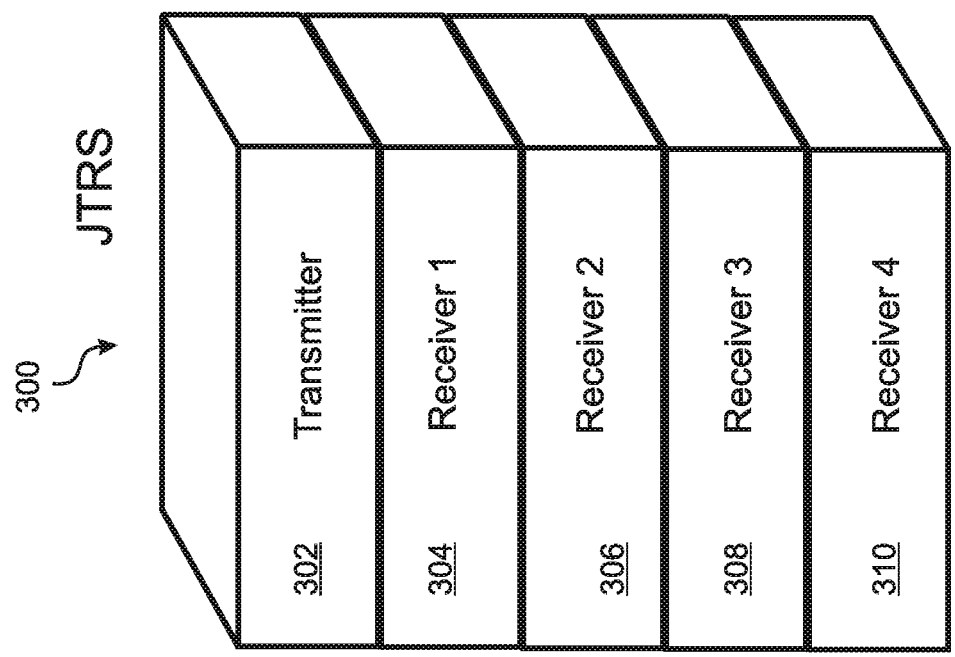
FIG. 3 illustrates the functional components of a JTRS terminal of the prior art.
Figure 2:
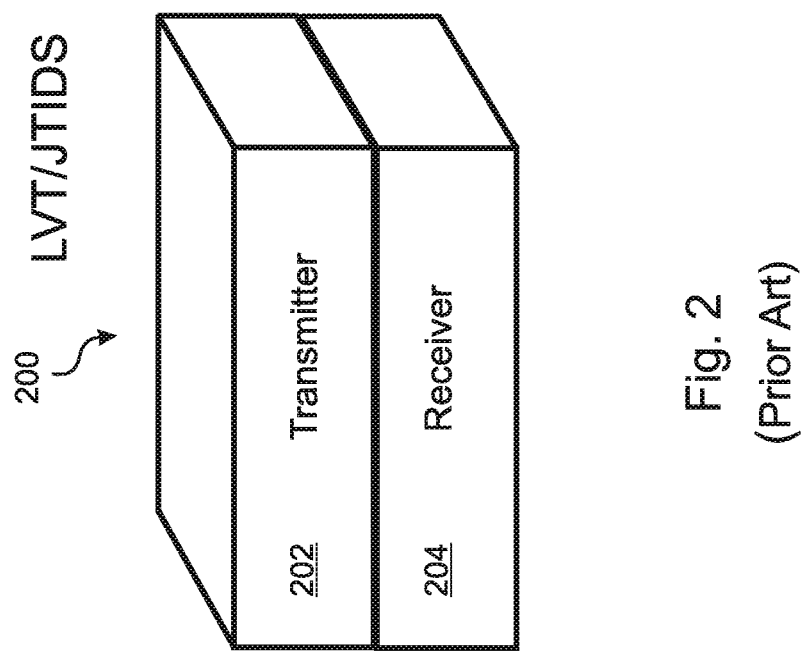
FIG. 2 illustrates the functional components of a JTIDS terminal of the prior art.
Figure 4:
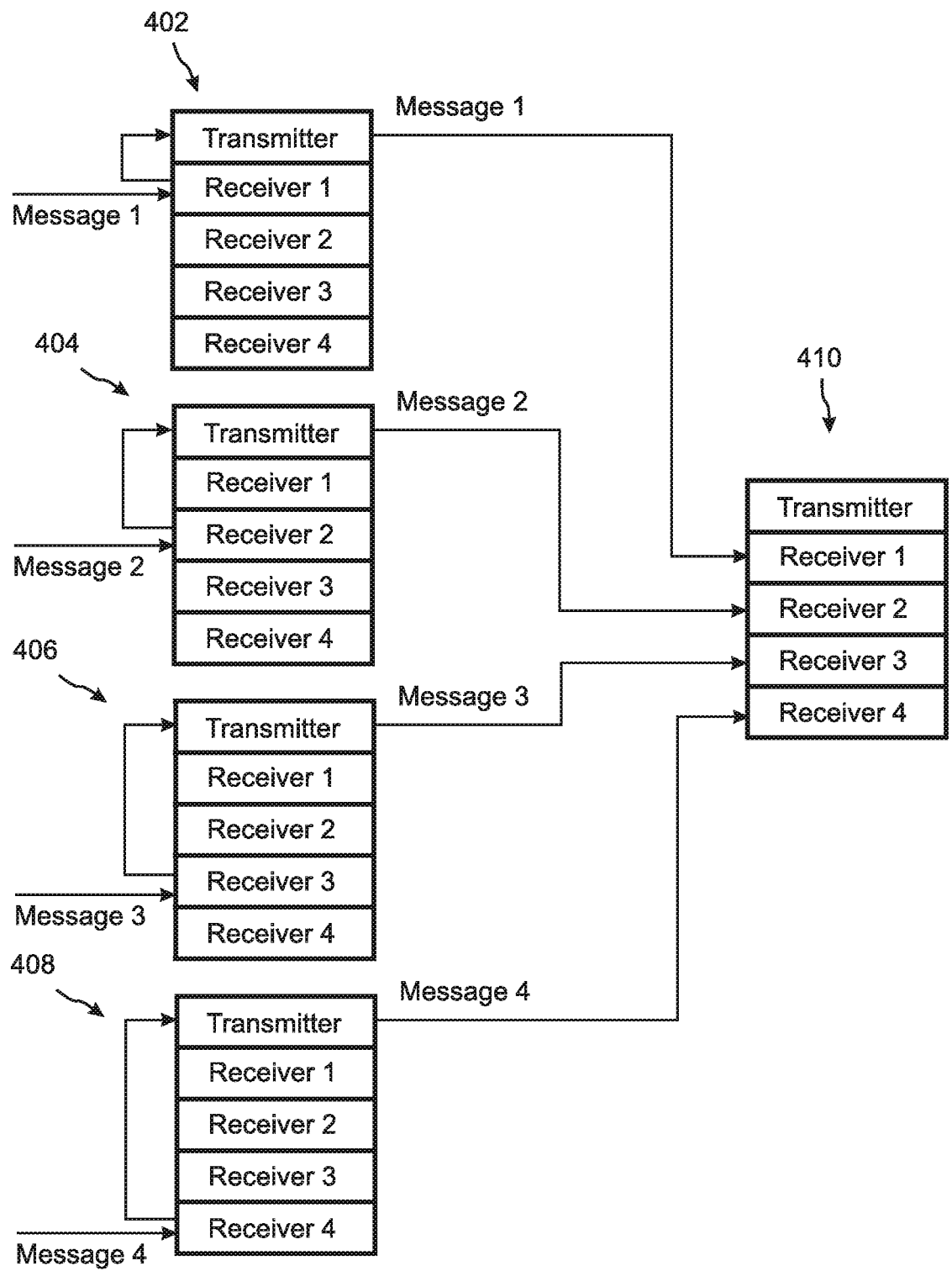
FIG. 4 is a flow diagram that illustrates relay of a plurality of Link 16 by a plurality of relay JTRS terminals over four subnets during a single timeslot.

FIG. 4 presents an example of JTRS Link 16 message relay in the prior art. The illustrated example assumes that a plurality of JTRS terminals 402-410 are all monitoring four different subnets using their four receiver channels 304-310. During timeslot "A," four messages (Message 1-4) are transmitted simultaneously over the four subnets, and are received by four of the JTRS terminals 402-410, all of which have been assigned as unconditional relay terminals. Terminal 410 is out of range, and cannot receive any of the four messages. Each of the four terminals 402-408 receives all four of the messages. However, each of them has only one transmitter 302, and so each of the relay terminals 402-408 is able to relay only one of the four messages over one of the subnets during a second timeslot "B," where timeslots A and B form a relay pair of timeslots for each of the subnets. As a result, the "out of range" JTRS terminal 410 is able to receive the four messages during timeslot B using its four receivers. In similar scenarios, the number of relay terminals can be reduced by increasing the number of relay timeslots, so that it is not necessary to retransmit all of the messages during the single timeslot "B." Nevertheless, it is clear that a plurality of terminals and/or relay timeslots is required, due to the "bottleneck" of each terminal including only one transmitter.

Figure 5A:
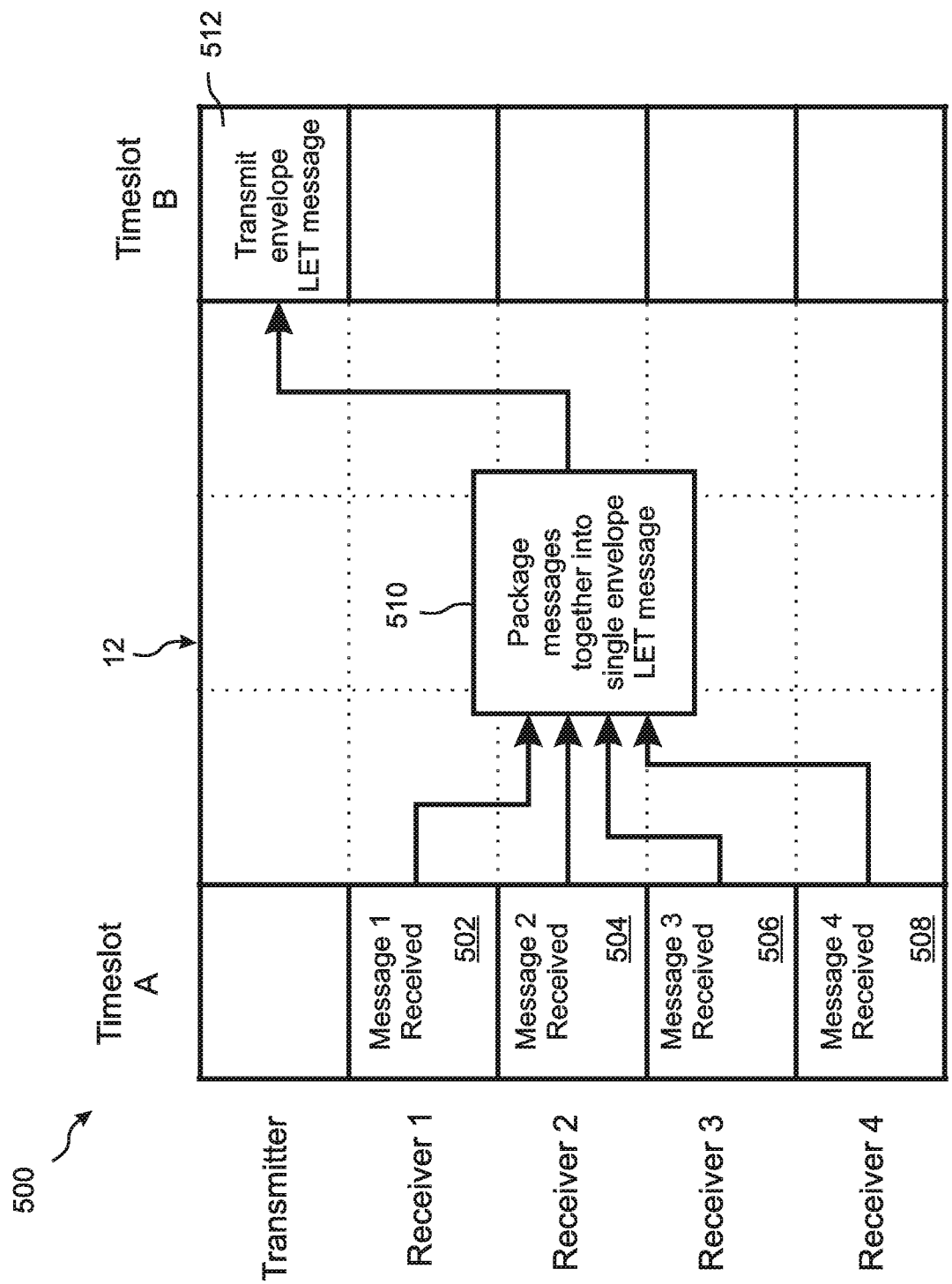
FIG. 5A is a flow diagram that illustrates transmitting of a plurality of Link 16 messages over a single subnet during a single timeslot according to an embodiment of the present disclosure.
Figure 5B:
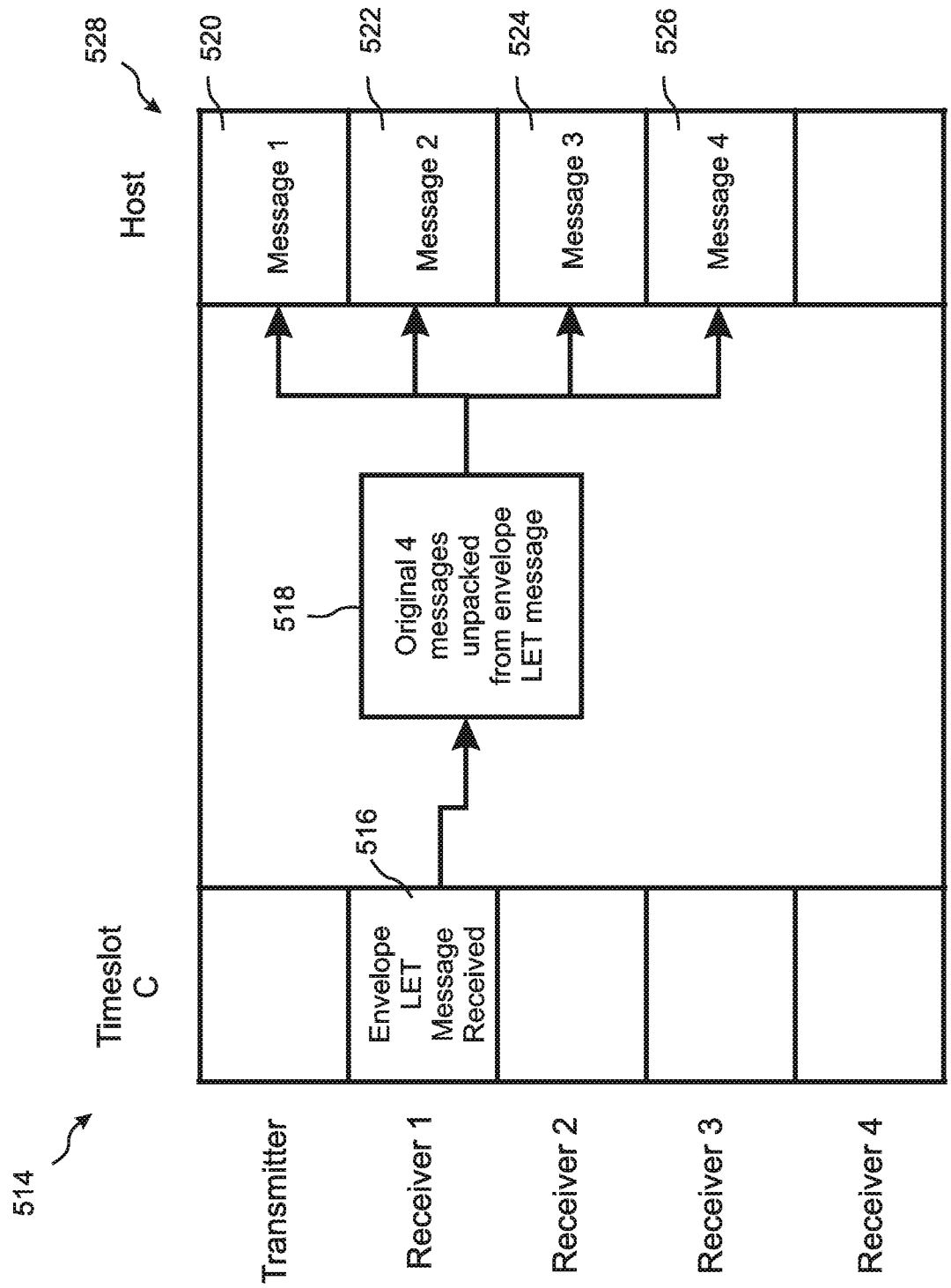
FIG. 5B is a flow diagram that illustrates receiving of a plurality of Link 16 messages over a single subnet during a single timeslot according to an embodiment of the present disclosure.

FIGS. 5A and 5B illustrate application of an embodiment of the present disclosure to the scenario of FIG. 4, whereby a single JTRS terminal 500 is able to relay all four of the messages in a single timeslot. In FIG. 5A, all four messages 502-508 are received by the single relay terminal 500 using the four receivers 304-310, as was also the case for each of the relay terminals 402-408 in FIG. 4. During an intervening time period, the relay terminal 500 uses an enhanced feature of the JTRS standard according to the present disclosure to concatenate or otherwise package 510 the four received messages 502-508 into a single Link 16 "envelope" enhanced transmission (LET) message, so that the envelope LET message can be re-transmitted 512 over a single channel during the single timeslot "B" at a high data rate by the transmitter of the relay terminal 500.

In FIG. 5B, the envelope LET message is received 516 by one of the receivers of the "out of range" terminal 514. The terminal 514 then unpacks 518 the four original, conventional Link 16 messages 520-526 from the envelope LET message, and presents them to the Host 528. From the point of view of the Host 528, the messages 520-526 are identical in form to any other conventional Link 16 messages, such that no modifications to the host are required.

In the example presented in FIGS. 5A and 5B four conventional Link 16 messages are packaged into a single envelope LET message. In various embodiments, the disclosed enhancement to the JTRS standard enables the terminal to package more than four messages within a single envelope LET message transmitted over a single timeslot. Accordingly, the "packaging" step of the present disclosure is not limited to any specific number of messages included in the package, nor is the present disclosure limited only to the relaying of messages.

In embodiments, the messages are concatenated within the envelope LET message, i.e. stored sequentially within the envelope LET message in substantially unmodified form. However, it should be understood that the scope of the present disclosure is not limited to concatenation of packaged messages, but extends to any message packaging format that enables a plurality of Link 16 messages to be packaged into a single LET message within a single timeslot, and to be recovered from the single LET message and restored to their original form without degradation. For example, embodiments include using lossless compression algorithms such as an "auto-encoder" to package a plurality of messages within a single envelope LET message.

It should further be noted that the present disclosure applies generally to the packaging of a plurality of Link 16 messages that would normally be transmitted separately at a first data rate into a single envelope LET message that can be transmitted within a single timeslot at a second data rate that is higher than the first data rate. In particular, the present disclosure is not limited to only packaging of messages received at the "standard" Link 16 data rate of 115 kbps, nor is it limited only to transmitting the envelope LET message at any specific data rate, except that the transmission data rate must be sufficiently high to enable the entire, envelope LET message to be transmitted within a single timeslot.

In the example of FIGS. 5A and 5B, a plurality of conventional Link 16 messages are received by an MIDS-JTRS terminal within a single timeslot A, and all of the received message are relayed as a signal envelope LET message during a signal timeslot B. In similar embodiments, a plurality of conventional Link 16 messages received during a plurality of timeslots can be packaged into a single envelope LET message and relayed during a single relay timeslot. Embodiments further enable an MIDS-JTRS terminal to receive and relay envelope LET messages in single relay pairs of timeslots, for example when messages must be relayed multiple times before they reach their intended hosts.

In embodiments, the format of the new envelope LET messages includes at least one identifying data symbol that identifies the LET message as being an envelope LET message, so that only Link 16 terminals in which the present disclosure has been implemented will attempt to receive and interpret the envelope LET messages. For example, current LET messages use a "1" (fixed format) or a "2" (Free Text) in the sixth header symbol. Embodiments of the present disclosure set this symbol to an otherwise unused value, i.e. to a value greater than 2. In some of these embodiments, the envelope LET message include a 3 or a 4 as the sixth header symbol, where "3" is used for a CVM message and "4" is used for a PVM message. In various embodiments, packaging and relaying of PVM messages within envelope LET messages does not require decoding of the PVM messages, and does not require knowledge by the relaying node of the MSEC key for the PVM messages.

Some embodiments of the present disclosure require that the messages that are packaged within the envelope LET message are all conventional "Fixed Format" J-code messages, i.e. FF-STD, FF-P2DP, or FF-P4. Other embodiments allow enhanced throughput messages and/or other messages having other formats to be packaged within an envelope LET message.

Embodiments transmit the envelope LET messages as J-code messages, and use a previously undefined J-series message codes, such as J31.6. Other embodiments avoid any need to modify the Link 16 message standard by transmitting the envelope LET messages as Link 16 "free text" messages. For example, all of the packaged messages, along with their header information, can be packaged together to create a single LET free text message. Since the envelope LET messages will not be directly delivered to a host (i.e. the packaged messages must be unpacked first), other fields can be marked as "reserved for terminal use."

Figure 6:
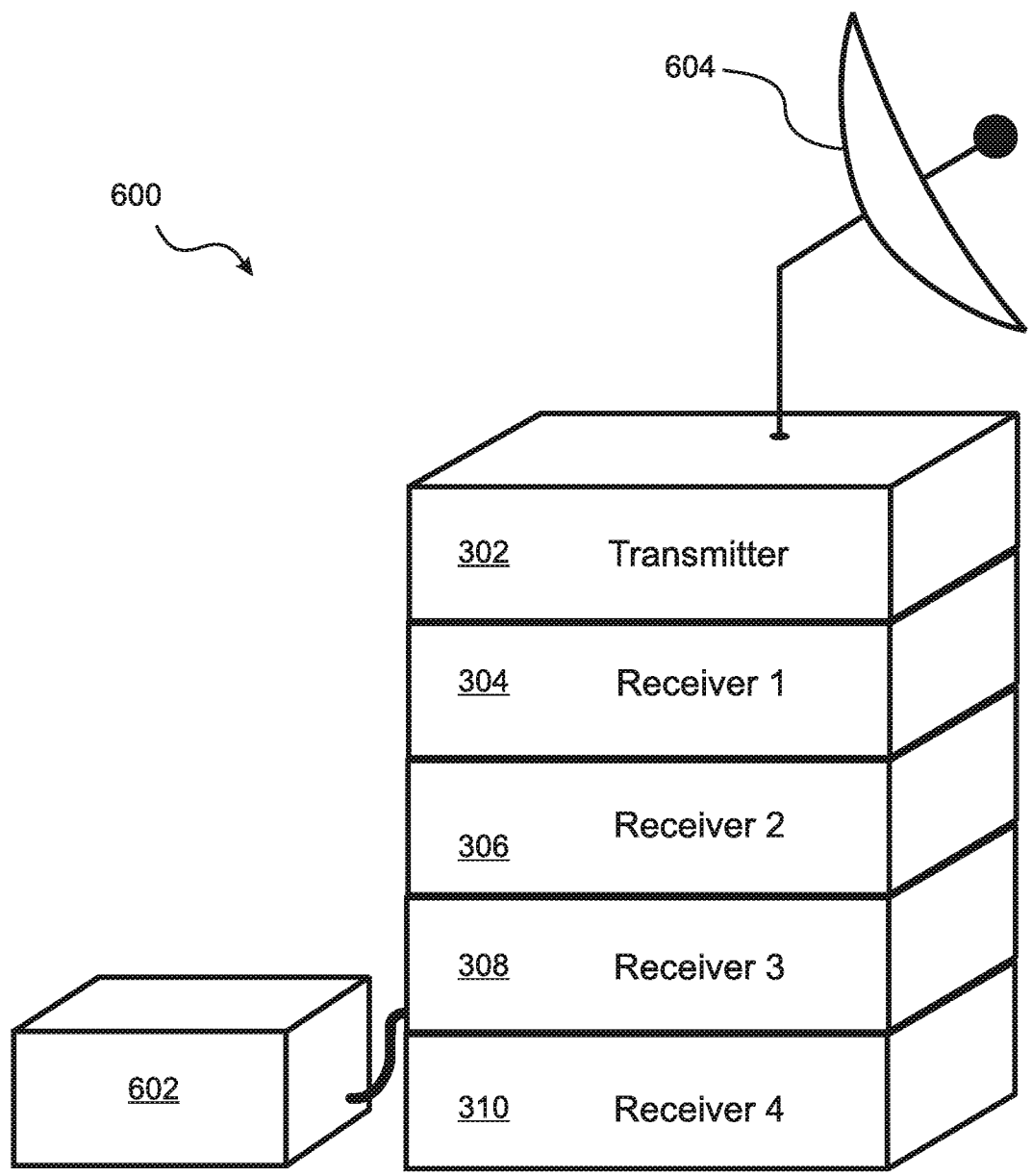
FIG. 6 illustrates an apparatus according to an embodiment of the present disclosure.
Figure 7:
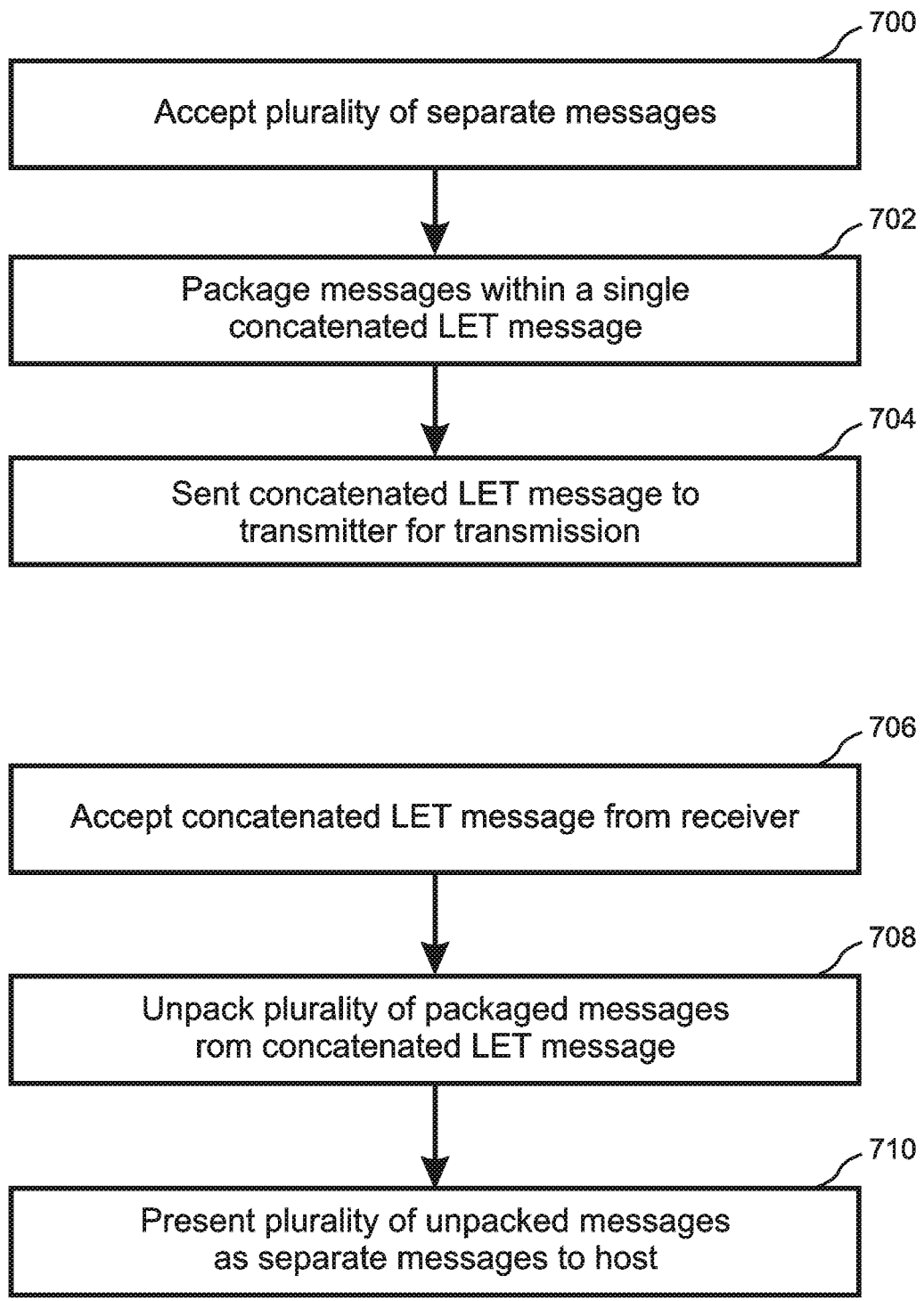
FIG. 7 is a flow diagram that illustrates methods of transmitting and receiving a plurality of Link 16 messages over a single subnet during a single timeslot according to an embodiment of the present disclosure.

An enhanced JTRS terminal 600 according to the present disclosure is illustrated in FIG. 6. In the illustrated embodiment, the terminal 600 includes a transmitter 302 and four receiver channels 304-310 that are cooperative with a transmit/receive antenna 604, as are included in a conventional JTRS terminal 300. In addition, with reference to FIG. 7, the enhanced terminal includes a controller 602 that is configured to accept a plurality of Link 16 messages 700 and package them 702 into a single envelope LET message that can be transmitted 704 by the transmitter 302 within a single timeslot 10. The controller 602 is further configured to accept an envelope LET message 706 from any of the receivers 304-310 according to the current disclosure, to unpack the plurality of messages 708 that are packaged within the envelope LET message, and present them 710 to the host 528 as if they had been received as separate messages, such that no modification or enhancement of the host 528 is required.

The foregoing description of the embodiments of the disclosure has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the disclosure to the precise form disclosed. Many modifications and variations are possible in light of this disclosure.

Although the present application is shown in a limited number of forms, the scope of the disclosure is not limited to just these forms, but is amenable to various changes and modifications without departing from the spirit thereof. The disclosure presented herein does not explicitly disclose all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

I claim:

1. A method operable by a transmitting terminal of transmitting a plurality of Link 16 messages on a single Link 16 channel within a single Link 16 timeslot from multiple transmitters, the method comprising:
   accepting the plurality of Link 16 messages;
   packaging the plurality of Link 16 messages as a single envelope Link 16 enhanced throughput (envelope LET) message, said plurality of Link 16 messages being packaged by the Link 16 terminal according to a packaging protocol that enables the Link 16 messages to be subsequently unpacked from the envelope LET message and restored to their original form prior to presentation to a host; and
   transmitting the envelope LET message.

2. The method of claim 1, wherein the plurality of Link 16 messages are 115 kbps Link 16 messages.

3. The method of claim 1, wherein the envelope LET message is transmitted at an LET data rate of 2 Mbps.

4. The method of claim 1, wherein the plurality of Link 16 messages are received messages that require retransmission according to a Link 16 message relay mode.

5. The method of claim 1, wherein the plurality of Link 16 messages includes at least four Link 16 messages.

6. The method of claim 1, wherein packaging the plurality of Link 16 messages includes concatenating them sequentially in substantially unmodified form within the envelope LET message.

7. The method of claim 1, wherein packaging the plurality of Link 16 messages includes applying a lossless compression algorithm to the Link 16 messages.

8. The method of claim 1, wherein the envelope LET message includes at least one identifying data symbol that enables the envelope LET message to be identified by a receiving terminal as an envelope LET message.

9. The method of claim 1, wherein the Link 16 messages are fixed format Link 16 messages.

10. The method of claim 1, wherein the Link 16 messages are free text Link 16 messages.

11. The method of claim 1, wherein no modifications to the host is required.

12. A method operable by a receiving terminal of receiving a plurality of Link 16 messages on a single Link 16 channel within a single Link 16 timeslot from multiple transmitters, the method comprising:
   receiving an envelope enhanced throughput (envelope LET) message within which the plurality of Link 16 messages is packaged by the Link 16 terminal according to a packaging protocol that enables the Link 16 messages to be subsequently unpacked from the envelope LET message and restored to their original form prior to presentation to a host;
   unpacking the plurality of Link 16 messages from the envelope LET message;
   restoring the Link 16 messages to their original form; and
   presenting the restored, unpacked Link 16 messages to the host.

13. The method of claim 12, wherein the envelope LET message includes at least one identifying data symbol that identifies the envelope LET message as an envelope LET message, and the method further comprises, before the step of unpacking:
   reading the at least one identifying data symbol; and
   identifying the envelope LET message as being an envelope LET message.

14. The method of claim 12, wherein the Link 16 messages are relayed Link 16 messages.

15. The method of claim 14, wherein the relayed Link 16 messages are relayed without decoding.

16. The method of claim 12, wherein the plurality of Link 16 messages are 115 kbps Link 16 messages.

17. The method of claim 12, wherein receiving the envelope LET message can include receiving the envelope LET message at an LET data rate of 2 Mbps.

18. The method of claim 12, wherein the Link 16 messages are free text or fixed format Link 16 messages.

19. The method of claim 12, further comprising a computer program product including one or more machine-readable mediums encoded with non-transitory instructions that when executed by one or more processors cause a process of receiving the envelope LET message, unpacking the plurality of Link 16 messages from the envelope LET message, restoring the Link 16 messages to their original form; and presenting the restored, unpacked Link 16 messages to the host.

20. An apparatus configured for transmitting and receiving a plurality of Link 16 messages on a single Link 16 channel within a single Link 16 timeslot from multiple transmitters, the apparatus comprising:

a plurality of transmitters;

a receiver channel;

an antenna cooperative with the transmitter and with the receiver channel; and a controller configured to:

accept the plurality of Link 16 messages;

package the plurality of Link 16 messages as a single envelope enhanced throughput (envelope LET) message, said plurality of Link 16 messages being packaged by the Link 16 terminal according to a packaging protocol that enables the Link 16 messages to be subsequently unpacked from the envelope LET message and restored to their original form prior to presentation to a host; and cause the transmitter to transmit the envelope LET message;

the controller being further configured to:

receive from the receiver channel an envelope enhanced throughput (envelope LET) message within which the plurality of Link 16 messages is packaged according to a packaging protocol that enables the Link 16 messages to be subsequently unpacked from the envelope LET message and restored to their original form;

unpacking the plurality of Link 16 messages from the envelope LET message;

restore the Link 16 messages to their original form; and present the restored, unpacked Link 16 messages to the host.

\* \* \* \* \*